(12) United States Patent
Chinigo

(10) Patent No.: US 6,352,269 B1
(45) Date of Patent: Mar. 5, 2002

(54) RANGE BASKET CADDY

(76) Inventor: Frank A. Chinigo, 7 Princeton Ct., Tinton Falls, NJ (US) 07724

( * ) Notice: Subject to any disclaimer, the term of this patent is extended or adjusted under 35 U.S.C. 154(b) by 0 days.

(21) Appl. No.: 09/662,291

(22) Filed: Sep. 14, 2000

(51) Int. Cl.[7] .............................................. B62B 1/00
(52) U.S. Cl. ................................ 280/47.17; 280/47.26; 280/47.18
(58) Field of Search ......................... 280/47.17, 47.18, 280/47.24, 47.26, 47.33, 79.5; 220/23.83, 676, 485

(56) References Cited

U.S. PATENT DOCUMENTS

| | | | | |
|---|---|---|---|---|
| 2,199,092 A | * | 4/1940 | Smith et al. ................. | 220/252 |
| 2,780,476 A | * | 2/1957 | Upchurch ................. | 280/47.24 |
| 2,838,320 A | * | 6/1958 | Sosalla ..................... | 280/47.24 |
| D183,960 S | * | 11/1958 | Carroll et al. ................ | D34/24 |
| 3,356,383 A | * | 12/1967 | Sneed ...................... | 280/47.26 |
| 4,383,695 A | * | 5/1983 | Ray ......................... | 280/47.26 |
| 4,844,526 A | * | 7/1989 | Young ....................... | 294/19.2 |
| 5,149,125 A | * | 9/1992 | Gray .......................... | 280/651 |
| 5,180,179 A | * | 1/1993 | Salvucci ................. | 280/47.315 |
| 5,549,215 A | * | 8/1996 | Cruce et al. ................. | 220/676 |
| D396,923 S | * | 8/1998 | Moore .......................... | D34/24 |
| 6,053,516 A | * | 4/2000 | Ottaway .................... | 280/79.5 |

* cited by examiner

*Primary Examiner*—J. J. Swann
*Assistant Examiner*—James S. McClellan
(74) *Attorney, Agent, or Firm*—Charles I. Brodsky

(57) ABSTRACT

A push-pull cart including a rod coupled between central hubs on each of a pair of wheels for joining them together as a single assembly, an elongated handle coupled to the rod at a vertical angle, and a golf ball caddy basket open at a top end to receive golf balls and closed at a bottom end to hold the golf balls in position—and with the caddy basket having an opening in the bottom end of dimension greater than a cross-section of the handle for fitting the basket over and down a length of the handle when devoid of added golf balls. In a preferred embodiment, the golf ball caddy baskets are selected of a given height in comparison with the length of the handle to allow 20–30 empty baskets to be nested together along the handle with the bottom end of the basket facing downwardly—thereby permitting the cart to be pushed or pulled about in returning empty golf ball caddy baskets to a vending machine or front desk area to be refilled for later practice use.

10 Claims, 4 Drawing Sheets

FIG. 5

RANGE BASKET CADDY

FIELD OF THE INVENTION

This invention relates to the sport of golf, in general, and to the practice of golf at a course or driving range, in particular.

BACKGROUND OF THE INVENTION

As is well known and understood, the sport of golf has never been more popular than it is today. Whether it is because of the emergence of attractive personalities on the professional tour, whether it is because of increased television and newspaper coverage, or whether it is because of improving global economies which free up money for the purchase of the fairly expensive equipment needed—or for whatever the reason—, the sport of golf has never been more appealing than it is at the present time. As a result, more-and-more golf courses are being readied for play each month, and retail golf "mega-store" supermarkets are opening weekly to satisfy the amateur's playing requirements.

As will also be understood, this increased interest in the game has carried with it the need to establish practice areas for play, either as part of the course facility itself, or at a separate, commercially operated driving range. There, the participant typically buys a basket of balls (either at a machine or from the operator of the facility) and then proceeds to carry that basket to the practice area. Experience has shown, however, that in most circumstances, the practicing player usually leaves the empty golf ball basket at the practice area, instead of returning it when finished. The practice facility operator then has to retrieve each and every basket, and has to return then to the front area to be refilled for later use. Depending on location and layout, this becomes somewhat of a chore—especially when it is appreciated that the carrying back of the empty basket may be over a distance of upwards of 50–100 yds. Add to this the fact that there may be 10, 20, 30 and more of these baskets to be recovered, the retrieval process may then necessitate several back-and-forth trips. As the individual baskets are frequently made of metal, weigh upwards of 1 lb. or more each, and stand 5 in. or more high, it will be appreciated that usually only 10–15 of them can be carried at any one time—balancing the baskets between one hand which supports their weight on the lower end, and trying to hold them steady with the other hand at the upper end, all-the-while trying to walk the baskets back to the front-desk area.

Experience has shown, furthermore, that when carrying metal baskets back in this manner, injuries to the fingers holding the metal baskets together frequently occur, in cutting, scratching, scraping, and catching them by, in, and amongst the component parts of the golf ball basket manufacture.

OBJECTS OF THE INVENTION

It is an object of the present invention, therefore, to provide a new and improved way of retrieving these baskets for later re-use.

It is an object of the present invention, also, to provide a new and improved manner of accomplishing this, employable both at the golf course practice area and at the commercial driving range facility.

It is another object of the present invention to provide this retrieval method at an economical cost.

SUMMARY OF THE INVENTION

As will become clear from the following description, the present invention relates to a cart similar in some respects to that which a weekend golfer might employ when playing a round of golf. As will be seen, however, rather than a cart to "pull" a bag of clubs from tee to green, the cart of the invention is more in the nature of a "push"-cart, on which the recovered golf ball baskets are carried for return.

More particularly, the cart of the invention (which still could be "pulled", as well as being "pushed") includes a rod coupled between central hubs on each of a pair of wheels which join the wheels together as a single assembly. An elongated handle couples to the rod at a vertical angle (preferably substantially perpendicular and substantially at a midpoint of the rod) for receiving a plurality of these golf ball baskets. As will be described, caddy baskets operative with the invention are open at a top end to receive the practice balls, and are closed at an opposing bottom end to hold the balls in position—but, with the caddy basket having an opening in the bottom of a dimension greater than a cross-section of the handle of the cart so as to fit empty baskets over and down the length of the handle. In accordance with the invention, the caddy basket is selected of a height to cooperate with a handle of 5 ft. length or so, to load 20–30 of the empty baskets at any one time.

In a preferred embodiment of the invention, the golf ball caddy basket is of a decreasing circular cross-section proceeding from its top end towards its bottom end, in enabling the baskets to be nested one into the other with the bottom end facing downwardly. In this embodiment, the basket may be of a fabricated metal composition—with the elongated handle being of metal, fiberglass or wood composition, and provided with a rubberized grip.

As will be appreciated then, the practice area worker or the driving range attendant simply wheels the push-pull cart assembly to the area where the caddy baskets have been collecting, slides each basket, bottom end down, on and along the length of the handle, nesting the baskets together. The assembly, with some 20–30 empty baskets in place, is then pushed or pulled back to the vending machine or desk area for the refilling of the baskets for use by the next practicing player.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE INVENTION

Figure 1:
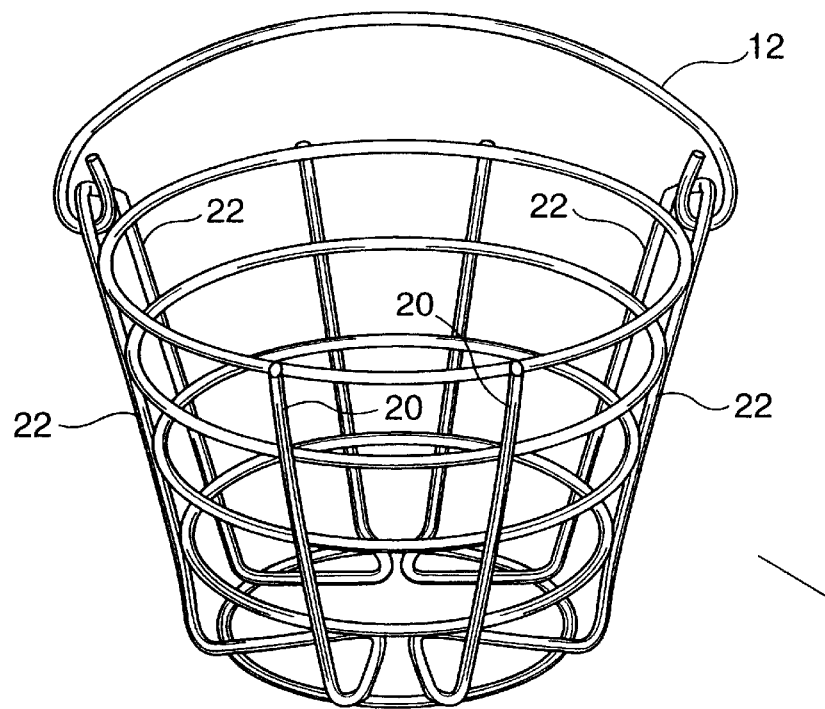
FIG. 1 is a perspective view of a pair of golf ball caddy baskets about to be nested together in carrying out the teachings of the present invention.
Figure 1:
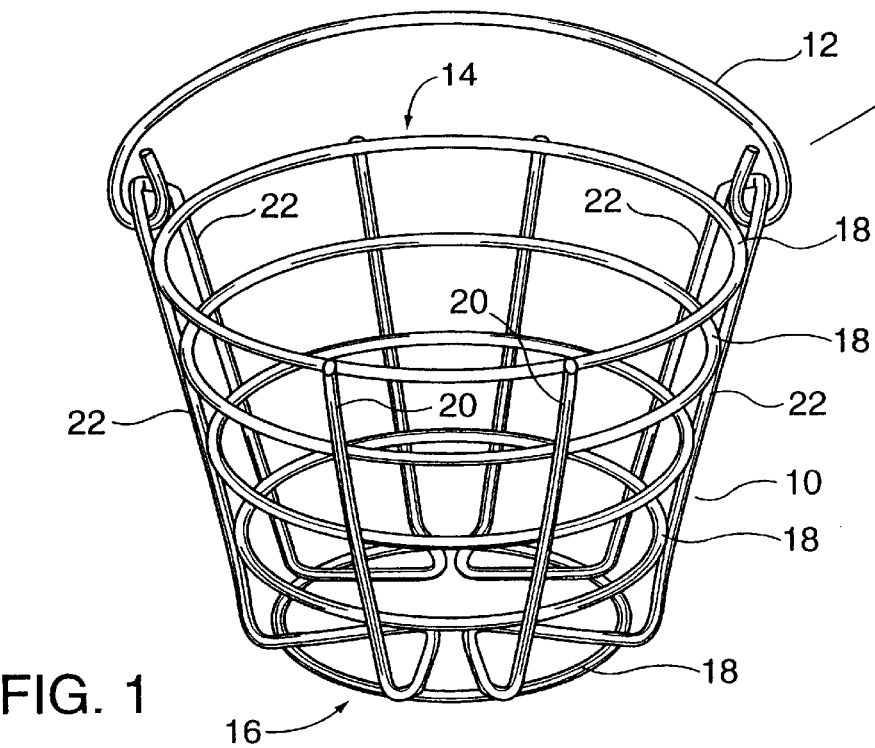
Figure 2A:
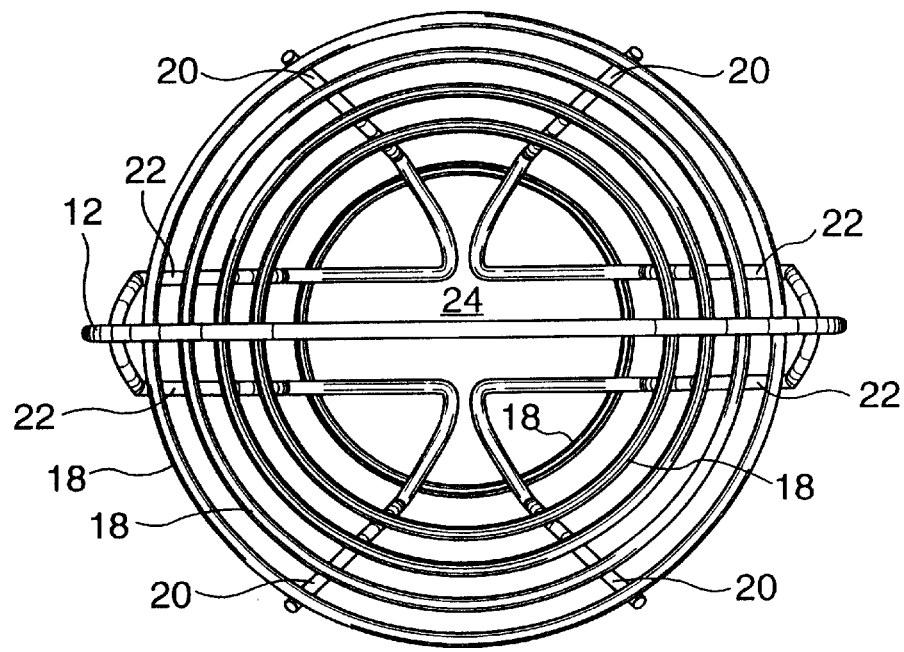
FIGS. 2A and 2B are top and bottom views of either of the two baskets, respectively.
Figure 2B:
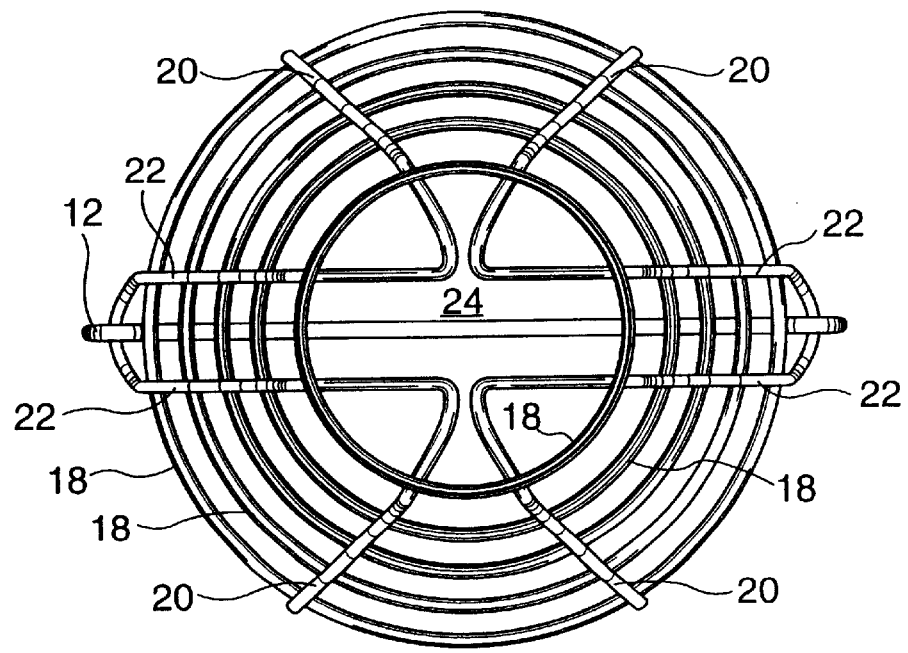

In FIGS. 1, 2A and 2B, the golf ball caddy basket is shown by the reference numeral 10 as being fabricated of metal, with a carry handle 12, with an open top end 14 to receive the golf balls, and with a bottom end 16 to hold the golf balls in position. Two such caddy baskets are shown in FIG. 1, available to be fitted together by virtue of their having gradually sloping cross sections of greatest diameter at their top ends 14 and least diameter at their bottom ends 16. Such caddy baskets 10 may be a height of 5–6 in. or more, with diameters of 7 in. at their top ends 14 and 4 in. at their bottom ends 16. In the embodiment of FIG. 1, the caddy basket 10 is composed of five concentric rings 18 of gradually changing diameter, with side support brackets 20 and with end brackets 22 for receiving the carry handle 12. All the rings 18, side support brackets 20 and end brackets 22 are welded together in this construction, with the support brackets 20 and the end brackets 22 forming an opening 24 in the bottom end 16 of a dimension insufficient to allow a golf ball to pass through.

Figure 3:
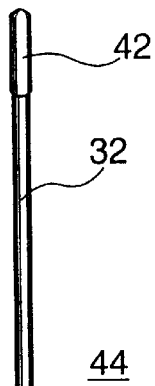
FIGS. 3, 4 and 5 are front, rear and side perspective views of the cart of the invention.
Figure 4:
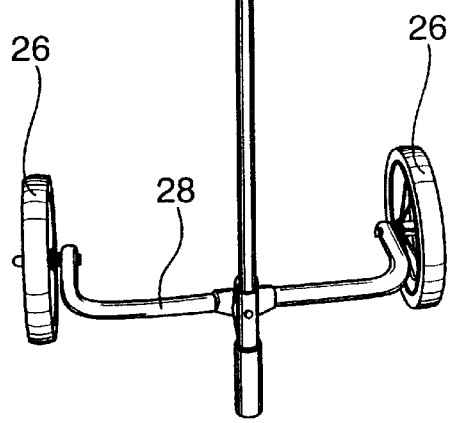
Figure 4:
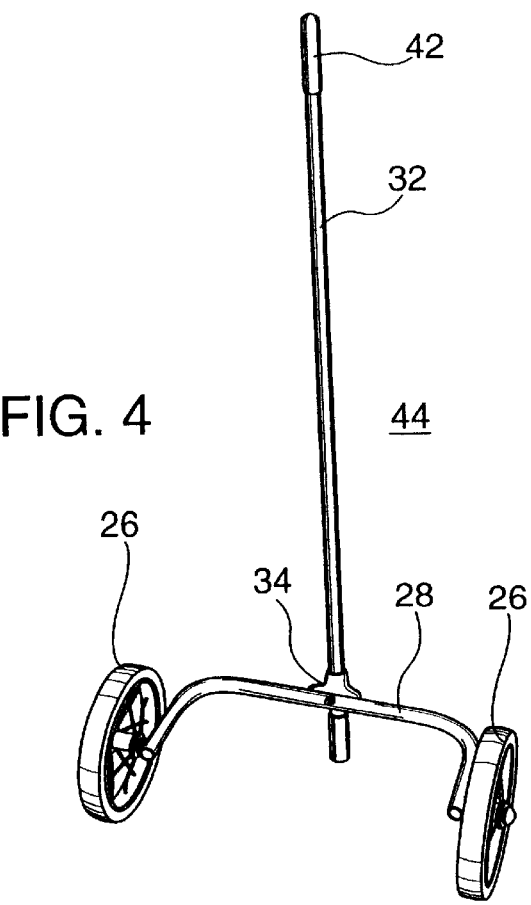
Figure 5:
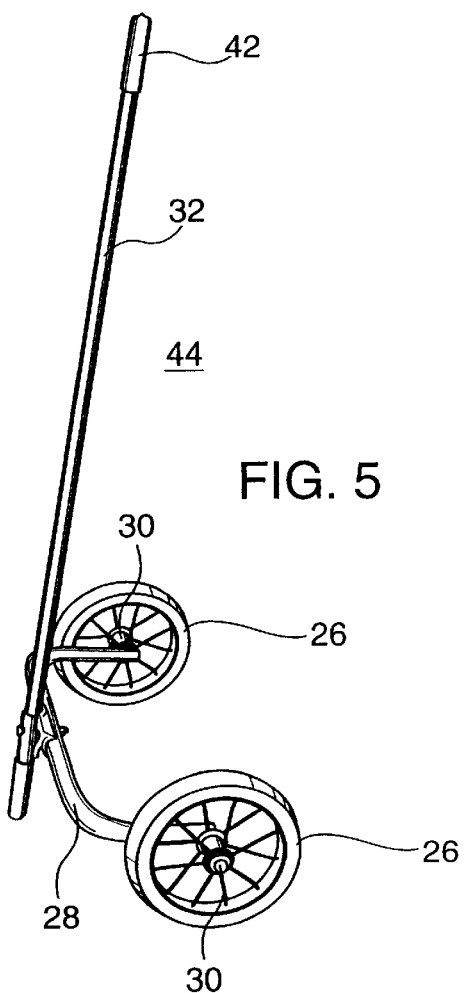
Figure 6:
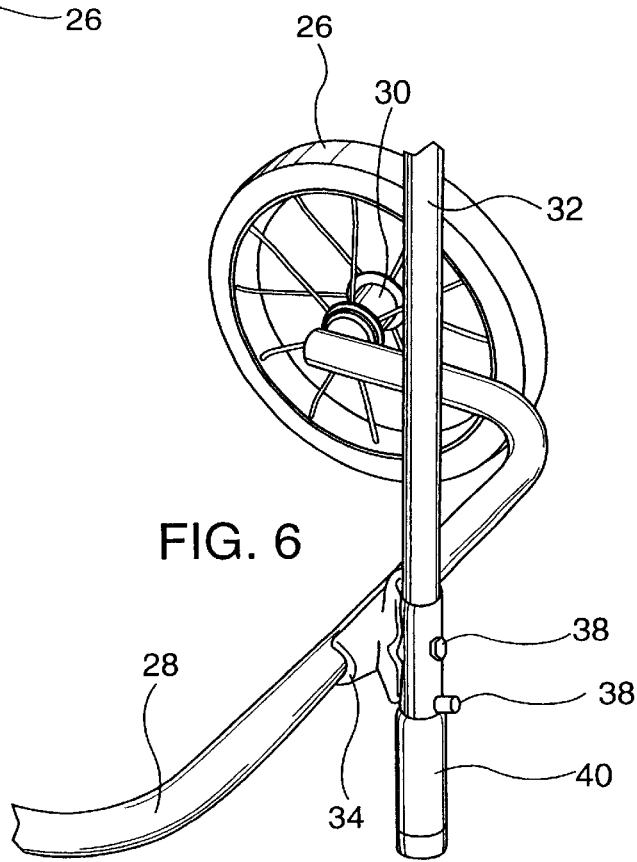
FIG. 6 is an illustration of one manner of fabricating the wheel assembly for use according to the invention.

The front, rear and side perspective views of FIGS. 3–5 show the push-pull cart assembly as including a pair of wheels 26 coupled together by a rod 28 which secures to the central hubs 30 of the wheels 26. An elongated handle 32 is vertically coupled to the rod 28, preferably substantially perpendicular to the rod 28, and at its midpoint 34 between the wheels 26. FIG. 6, in this respect, shows the handle 32 being secured to the rod 28 by screws or bolts 38, and shows the bottom end 40 of the handle 32 extending further to reach the ground so that the assembly is able to stand upright awaiting use. Preferably fabricated of metal, the handle 32 could alternatively be of a fiberglass or wood construction, all with a rubberized grip 42 at its upper end. In accordance with the invention, the handle 32 is selected of a dimension less than the opening 24 formed by the support brackets 20 and the end brackets 22. In this manner, empty baskets 10 are able to be fitted over the handle 32 bottom end first, and slid down along its length to be stacked upwardly from the rod 28.

With the handle 32 selected of a 5 ft. length or so, some 20, 5 in. high caddy baskets 10 can easily be fitted onto the handle 32 just by dropping one basket onto the one immediately below it when inserted with the bottom end facing down. By compressing the nested baskets, approximately 30 of them could be similarly stacked. In either instance, it becomes an easy matter to then push the cart back to the vending machine or front desk area to refill the baskets, or to pull the cart in navigating or negotiating the needed turns to return the empty caddy baskets.

Experience has also shown that merely leaving the wheeled assembly 44 unattended in the standing, vertical position of FIGS. 3–5 at the practice area or at the tee area itself produces an opportunity for a practicing player to place an empty, used-up basket onto the elongated handle 32 himself or herself to begin with. This will be seen to make the task of recovery that much easier, as the practice area worker or driving range attendant then only has to retrieve a decreased number of empty baskets. This has been proven to be yet another advantage of the push-pull cart basket caddy of the invention.

While there have been described what are considered to be preferred embodiments of the present invention, it will be readily appreciated by those skilled in the art that modifications can be made without departing from the scope of the teachings herein—such as including, if desired, a washer on the handle 32 adjacent the rod 28 to support the bottom end of the caddy baskets 10 being stacked. For at least such reason, therefore, resort should be had to the claims appended hereto for a true understanding of the scope of the invention.

I claim:

1. A driving range cart apparatus comprising:

a push-pull cart including a rod coupled between central hubs on each of a pair of wheels joining said wheels together as a single assembly, and an elongated handle coupled to said rod at a vertical angle; and a golf ball caddy basket fitted onto and down a length of said handle when devoid of golf balls, with said basket being open at a top end and closed at an opposing bottom end, with said caddy basket having an opening in said bottom end of dimension greater than a cross-section of said handle fitted therethrough, and with said caddy basket being fitted onto said elongated handle with said bottom end facing downwardly.

2. The driving range cart apparatus of claim 1 wherein said handle is coupled to said rod at a vertical angle substantially perpendicular thereto and substantially at a mid-point thereof.

3. The driving range cart apparatus of claim 2, including at least one additional golf ball caddy basket of like configuration and dimension fitted into said first basket and up said length of said handle when devoid of added golf balls.

4. The driving range cart apparatus of claim 3 wherein each of said golf ball caddy baskets is of a given height, and wherein said elongated handle is of a length to receive between 20 and 30 empty golf ball caddy baskets at any one instant of time.

5. The driving range cart apparatus of claim 4 wherein said elongated handle is substantially 5 ft. in length.

6. The driving range cart apparatus cart of claim 5 wherein each of said golf ball caddy baskets is of a decreasing circular cross-section along its height, greatest at said top end thereof and least at said bottom end thereof.

7. The driving range cart apparatus of claim 6 wherein each said golf ball caddy baskets is of a fabricated metal position.

8. The driving range cart apparatus of claim 6 wherein said elongated handle is of a metal, fiberglass or wood composition.

9. The driving range cart apparatus of claim 8 wherein said elongated handle is provided with a rubberized grip.

10. A driving range cart apparatus comprising:

a push-pull cart including a rod coupled between central hubs on each of a pair of wheels joining said wheels together as a single assembly, and an elongated handle coupled to said rod at a vertical angle; and a plurality of golf ball caddy baskets, each of which is fitted onto and down a length of said handle when devoid of golf balls, with each of said baskets being open at a top end and closed at an opposing bottom end, with each of said caddy baskets having an opening in said bottom end of dimension greater than a cross-section of said handle fitted therethrough, with each of said caddy baskets being fitted onto said elongated handle with their said bottom ends facing downwardly, and with each of said golf ball caddy baskets being of a decreasing circular cross-section along their respective heights, greatest at the top end thereof and least at the bottom end thereof.

* * * * *